(12) United States Patent
Ha et al.

(10) Patent No.: US 12,494,032 B2
(45) Date of Patent: Dec. 9, 2025

(54) REFRIGERATOR

(71) Applicant: LG ELECTRONICS INC., Seoul (KR)

(72) Inventors: Jeongyo Ha, Seoul (KR); Hyunsung Park, Seoul (KR); Joongkeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 376 days.

(21) Appl. No.: 18/023,470

(22) PCT Filed: Sep. 2, 2021

(86) PCT No.: PCT/KR2021/011816
§ 371 (c)(1),
(2) Date: Feb. 27, 2023

(87) PCT Pub. No.: WO2022/050703
PCT Pub. Date: Mar. 10, 2022

(65) Prior Publication Data
US 2023/0316695 A1    Oct. 5, 2023

(30) Foreign Application Priority Data

Sep. 2, 2020   (KR) .................. 10-2020-0111747

(51) Int. Cl.
*G06V 10/25*   (2022.01)
*F25D 25/02*   (2006.01)
*G06T 7/73*    (2017.01)

(52) U.S. Cl.
CPC .......... *G06V 10/25* (2022.01); *F25D 25/025* (2013.01); *G06T 7/73* (2017.01);
(Continued)

(58) Field of Classification Search
CPC . G06V 10/25; F25D 25/025; F25D 2323/021; F25D 2400/36; F25D 2700/06;
(Continued)

(56) References Cited

U.S. PATENT DOCUMENTS

| 2006/0096303 A1* | 5/2006 | Kavounas | F25D 29/00 |
| | | | 62/331 |
| 2011/0181163 A1* | 7/2011 | Han | F25D 23/04 |
| | | | 312/405 |
| 2013/0057694 A1* | 3/2013 | Petricoin, Jr. | H04N 23/695 |
| | | | 348/155 |

FOREIGN PATENT DOCUMENTS

| CN | 101949627 | * | 1/2011 | ............. F25D 27/00 |
| CN | 110779258 | * | 2/2022 | ............. H04N 7/181 |

(Continued)

OTHER PUBLICATIONS

International Search Report dated Dec. 1, 2021 issued in Application No. PCT/KR2021/011816.

*Primary Examiner* — Jerome Grant, II
(74) *Attorney, Agent, or Firm* — KED & ASSOCIATES, LLP

(57) ABSTRACT

A refrigerator according to the present embodiment comprises: a cabinet comprising a storage chamber; a drawer that is provided in the storage chamber and can slide in and out; a drawer sensing unit that is provided in the cabinet and can sense whether the drawer is in or out; a refrigerator door for opening and closing the storage chamber; a camera that is installed in the cabinet and captures an image of the storage chamber including the drawer during the opening and closing of the drawer; and a controller that controls so that one image is selected from among a plurality of images sequentially captured by the camera, and a result image including at least a portion of the selected image is displayed in a display unit, wherein the controller extracts a region of
(Continued)

interest (ROI) image corresponding to the drawer from each of the plurality of images, determines a movement direction and movement amount of the drawer on the basis of the plurality of extracted ROI images, selects one ROI image from among the plurality of ROI images on the basis of the determined movement direction and movement amount of the drawer, and determines the selected one ROI image as an image to be displayed.

20 Claims, 11 Drawing Sheets

(52) U.S. Cl.
CPC .... *F25D 2323/021* (2013.01); *F25D 2400/36* (2013.01); *F25D 2700/06* (2013.01)

(58) Field of Classification Search
CPC ............. F25D 2400/361; F25D 29/005; F25D 2700/02; G06T 7/73; G06T 7/20; H04N 5/77; H04N 7/18; H04N 7/181

USPC ......................................................... 382/103
See application file for complete search history.

(56) References Cited

FOREIGN PATENT DOCUMENTS

| EP | 3764044 | * | 1/2021 | ............. F25D 25/02 |
|----|---------|---|--------|------------------------|
| JP | 2002-267337 | | 9/2002 | |
| JP | 2014070796 | * | 4/2014 | |
| KR | 10-2015-0127560 | | 11/2015 | |
| KR | 20150127560 | * | 11/2015 | ............. F25D 25/00 |
| KR | 20190111858 | * | 10/2019 | ............. F25D 29/00 |
| KR | 10-2020-0085702 | | 7/2020 | |
| KR | 20200085702 | * | 7/2020 | ............. F25D 25/00 |
| KR | 102168062 | * | 10/2020 | ............. F25D 23/00 |

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2021/011816, filed Sep. 2, 2021, which claims priority to Korean Patent Application No. 10-2020-0111747, filed Sep. 2, 2020, whose entire disclosures are hereby incorporated by reference.

TECHNICAL FIELD

The present disclosure relates to a refrigerator.

BACKGROUND ART

In general, a refrigerator is a home appliance that allows food to be stored at a low temperature in an internal storage space shielded by a door. To this end, the refrigerator is configured to cool the inside of the storage space using cold air generated through heat exchange with a refrigerant circulating in a refrigerating cycle, thereby storing food in an optimal state.

Recently, refrigerators are gradually becoming larger and more multi-functional in accordance with the trend of changing dietary habits and upgrading products, and refrigerators equipped with various structures and convenience devices capable of improving user convenience and efficiently using an internal space are being released.

The storage space of the refrigerator may be opened and closed by a door. Depending on the arrangement of the storage space and the structure of the door that opens and closes the storage space, the refrigerators may be classified into various types of refrigerators.

A separate storage space accessible from the outside may be provided in the door of the refrigerator. Through such a storage space, it is possible to access the storage space by opening some auxiliary doors or home bar doors without opening the entire refrigerator door.

Accordingly, frequently used foods may be stored in the separate storage space provided in the refrigerator door. Since the entire refrigerator door is not opened to store food, there is an advantage in minimizing leakage of cool air inside the refrigerator to the outside.

However, even in this structure, there is fundamentally a problem in that the food inside cannot be checked unless the refrigerator door is opened. That is, the door shall be opened to check whether desired food is stored in the space inside the refrigerator or in the separate storage space provided in the door. If there is no desired food when opening the auxiliary door or the home bar door, there is an inconvenience such as having to open the main door again, and at this time, there is a problem in that unnecessary leakage of cold air may occur.

In order to solve this problem, a part of a front surface of the refrigerator door may be formed of a transparent material, but in this case, an insulation problem may occur in the refrigerator. In addition, when the inside of the refrigerator may be seen through even when the refrigerator is not in use, food is exposed to the outside as it is, resulting in a very poor appearance.

Meanwhile, Korean Laid-Open Patent Publication No. 10-2015-0127560 (publication date: Nov. 17, 2015), which is a prior document, provides a refrigerator capable of providing information about food stored in a refrigerator even if a user does not open a door.

The refrigerator may include a cabinet having an opening formed in a front surface to allow a user to take in and take out food; a door rotatably mounted on the cabinet to open and close the opening; a storage space accommodated in the cabinet, partitioned between the door and the cabinet, and forming an independent cold air holding space for storing food therein; and a camera installed inside the storage space to obtain an image by photographing the food stored in the storage space.

A drawer to be withdrawn and retreated is provided in the storage space, and a marker is provided on the drawer.

According to prior document, a technique of displaying an image photographed by a camera on a door after the door is opened is disclosed.

In the prior document, after a camera photographs a drawer including a marker, the position of the drawer is determined based on the position of the marker on an image including the marker.

According to the prior document, since the marker is located on the upper surface of the drawer, the marker is immediately exposed to the outside in a state in which the drawer is withdrawn, resulting in a problem of deterioration in aesthetics.

In addition, when the marker is damaged or contaminated, the marker in the image photographed by the camera is not accurately recognized, and thus the position of the drawer cannot be accurately determined.

Invention

Technical Problem

The present embodiment provides a refrigerator capable of checking food stored in a storage space in a state of closing a refrigerator door.

Optionally or additionally, the present embodiment provides a refrigerator capable of displaying an optimal image on a display by analyzing photographed images and accurately determining the position of a sliding drawer without a marker.

Optionally or additionally, the present embodiment provides a refrigerator capable of showing an optimal image to a user without increasing the size of a memory.

Technical Solution

A refrigerator comprises a cabinet including a storage space, a drawer provided in the storage space and configured to be slidably withdrawn and retreated, a drawer detector provided in the cabinet and configured to detect withdrawal and retraction of the drawer, a refrigerator door configured to open and close the storage space, a camera provided in the cabinet to photograph the storage space including the drawer in a process of opening and closing the drawer, and a controller configured to select an image from among a plurality of images sequentially photographed by the camera and to display a resultant image including at least a part of the selected image on a display.

The controller may extract a region of interest (ROI) image corresponding to the drawer from each of the plurality of images.

The controller may determine an orientation and magnitude of the drawer based on a plurality of extracted ROI images.

For example, the controller may determine the orientation and magnitude of the drawer by extracting a plurality of feature points from the plurality of extracted ROI images and determining orientations and magnitudes of the feature points.

The controller may select one ROI image from the plurality of ROI images based on the determined orientation and magnitude of the drawer.

The controller may determine the selected ROI image as an image to be displayed.

The controller may determine the orientation and magnitude of the drawer by preprocessing each of the plurality of extracted ROI images and extracting a plurality of feature points from the preprocessed images, select one preprocessed image from the plurality of preprocessed images based on the determined orientation and magnitude of the drawer, and determine a ROI image corresponding to the selected preprocessed image as an image to be displayed The controller may select a ROI image with a maximum withdrawal distance and a minimum orientation of the drawer from among the plurality of extracted ROI images.

The door may include a first door and a second door arranged in a left-and-right direction, and the drawer may include a left drawer and a right drawer.

An image photographed by the camera may include an open drawer between the left drawer and the right drawer.

The resultant image may include divided left and right drawer image parts.

When the left drawer is opened and then closed in a state in which the second door is closed and the first door is opened, the controller may extract a plurality of ROI images corresponding to the left drawer from the plurality of photographed images, analyze the plurality of extracted ROI images and determine an image to be displayed. The display may display a resultant image including an updated left drawer image part and a past right drawer image part stored in a memory.

When the right drawer is opened and then closed in a state in which the first door is closed and the second door is opened, the controller may extract a plurality of ROI images corresponding to the right drawer from the plurality of photographed images, analyze the plurality of extracted ROI images and determine an image to be displayed. The display may display a resultant image including a past left drawer image part stored in a memory and an updated right drawer image part.

When the left drawer and the right drawer are opened and then closed in a state in which the first door and the second door are opened, the controller may extract a plurality of first ROI images corresponding to the left drawer and a plurality of second ROI images corresponding to the right drawer from the plurality of photographed images, analyze the plurality of extracted first and second ROI images and determine an image to be displayed. The display may display a resultant image including an updated left drawer image part and an updated right drawer image part.

When the left drawer is opened and then closed in a state in which the second door is closed and the first door is opened, the controller may extract a plurality of ROI images corresponding to the left drawer from the plurality of photographed images, analyze the plurality of extracted ROI images and determine an image to be displayed. When a condition for extracting one ROI image from the plurality of extracted ROI images is not satisfied, the display may display a resultant image including a past left drawer image part stored in a memory and a past right drawer image part stored in the memory.

When the right drawer is opened and then closed in a state in which the first door is closed and the second door is opened, the controller may extract a plurality of ROI images corresponding to the right drawer from the plurality of photographed images, analyze the plurality of extracted ROI images and determine an image to be displayed. When a condition for extracting one ROI image from the plurality of extracted ROI images is not satisfied, the display may display a resultant image including a past left drawer image part stored in a memory and a past right drawer image part stored in the memory.

When the left drawer and the right drawer are opened and then closed in a state in which the first door and the second door are opened, the controller may extract a plurality of first ROI images corresponding to the left drawer and a plurality of second ROI images corresponding to the right drawer from the plurality of photographed images, analyze the plurality of extracted first and second ROI images and determine an image to be displayed. When a condition for extracting one ROI image from the plurality of extracted ROI images is not satisfied, the display may display a resultant image including a past left drawer image part stored in a memory and a past right drawer image part stored in the memory.

A shelf located above the drawer and an accommodation space located below the drawer may be further included. The camera may photograph the storage space in a process of opening and then closing the door in a state of closing the drawer, and an image photographed by the camera may include the shelf and the accommodation space.

After closing the door, the display may display a resultant image including a first image part including the shelf, a third image part including the drawer and a second image part including the accommodation space.

The door may include a first door and a second door arranged in a left-and-right direction, and an image photographed by the camera may include a left accommodation space and a right accommodation space. The resultant image may include divided left and right accommodation space image parts.

When the second door is opened and then closed in a state in which the first door is closed and the drawer is closed, the display may display an updated first image part, a past third image part stored in a memory, a past left accommodation space image part stored in a memory and an updated right accommodation space image part.

When the first door is opened and then closed in a state in which the second door is closed and the drawer is closed, the display may display an updated first image part, a past third image part stored in a memory, an updated left accommodation space image part and a past right accommodation space image part stored in the memory.

When the first and second doors are sequentially or simultaneously opened and then closed in a state of closing the drawer, the display may display a resultant image including an updated first image part, a past third image part stored in a memory, an updated left accommodation space image part and an updated right accommodation space image part.

The camera may photograph the storage space in a process in which one or more of the first door and the second door is opened at an opening reference angle or more and then closed.

Effect of the Invention

According to the present embodiment, it is possible to check food stored in a storage space in a state of closing a refrigerator door.

According to the present embodiment, since photographed images are analyzed to determine the position of a sliding drawer, it is possible to display an optimal image on a display by accurately determining the position of the drawer without a marker. In addition, since a marker is not present on the drawer, it is possible to preventing deterioration in aesthetics when the drawer is withdrawn.

According to the present embodiment, since images are sequentially stored during a reference time set in a memory and images to be displayed are determined in reverse order of a storage completion time, it is possible to show an optimal image to a user without increasing the size of a memory.

BEST MODE

Figure 1:
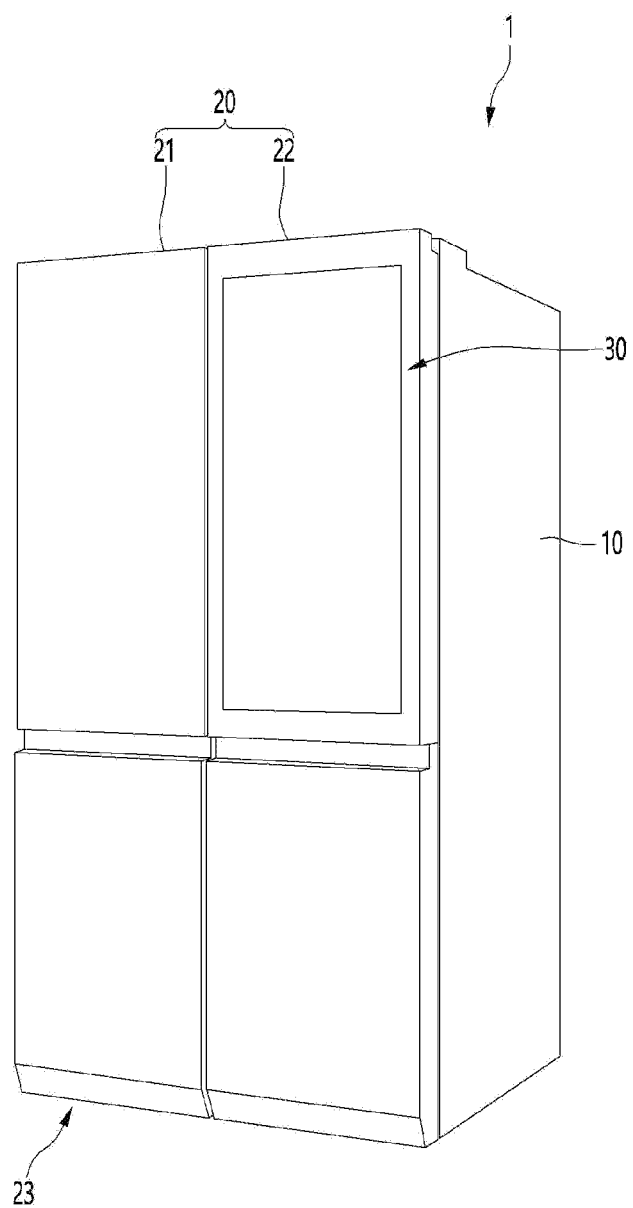
FIG. 1 is a perspective view of a refrigerator according to the present embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
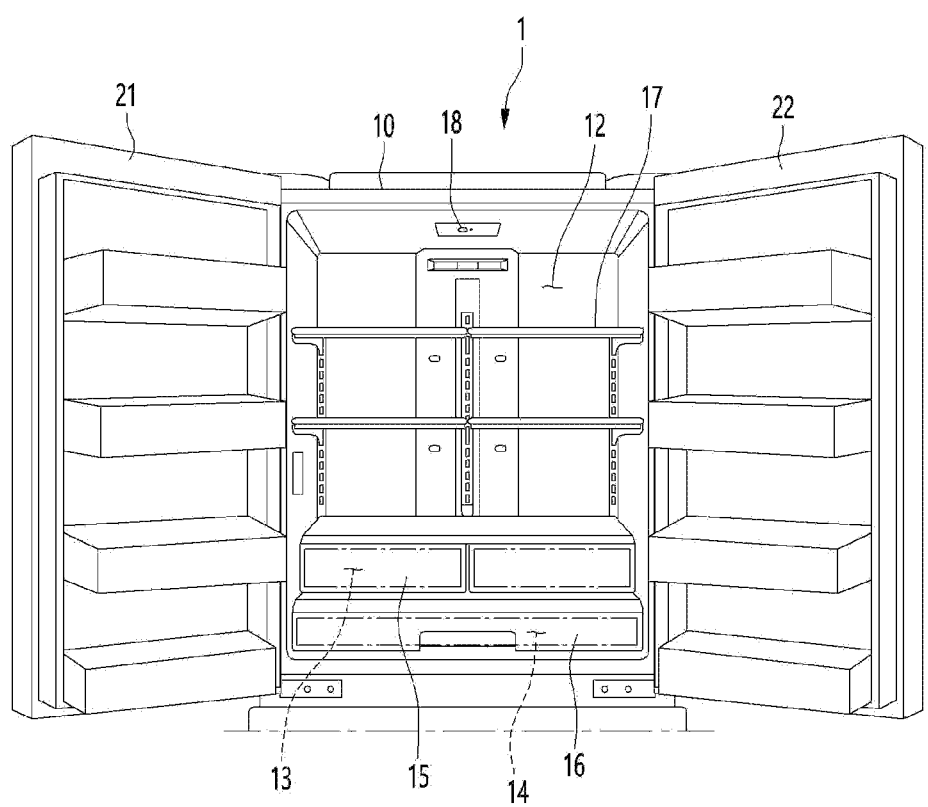
FIG. 2 is a view showing a state in which a refrigerating space door of the present embodiment is opened.
Figure 3:
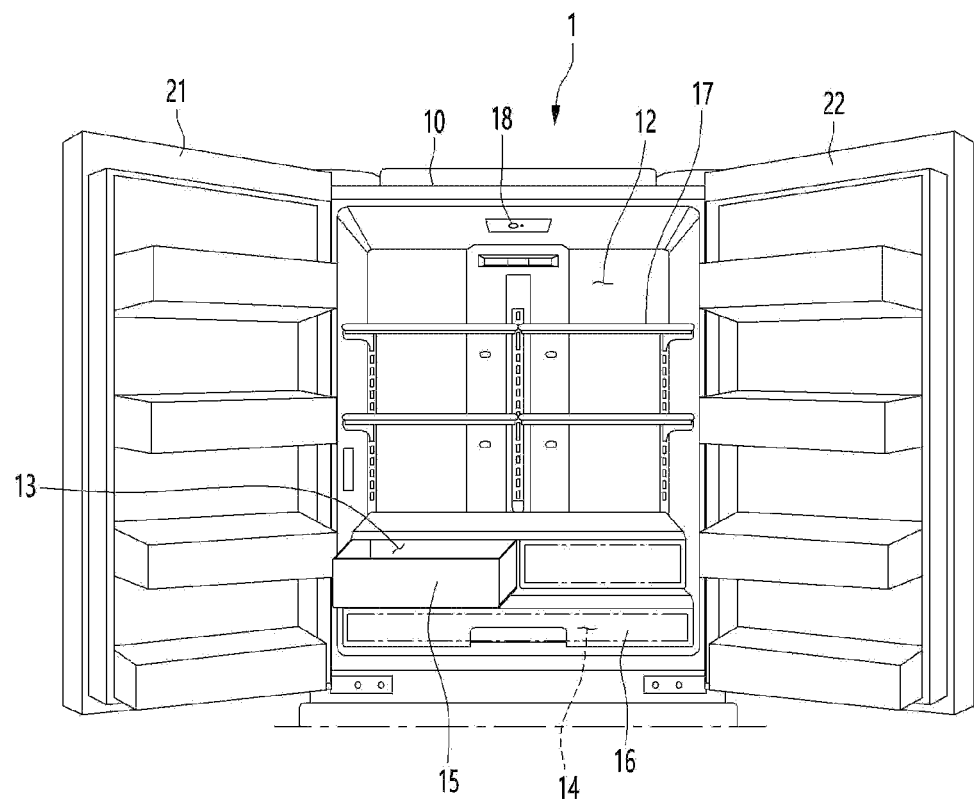
FIG. 3 is a view showing a state in which a drawer is withdrawn according to the present embodiment.
Figure 4:
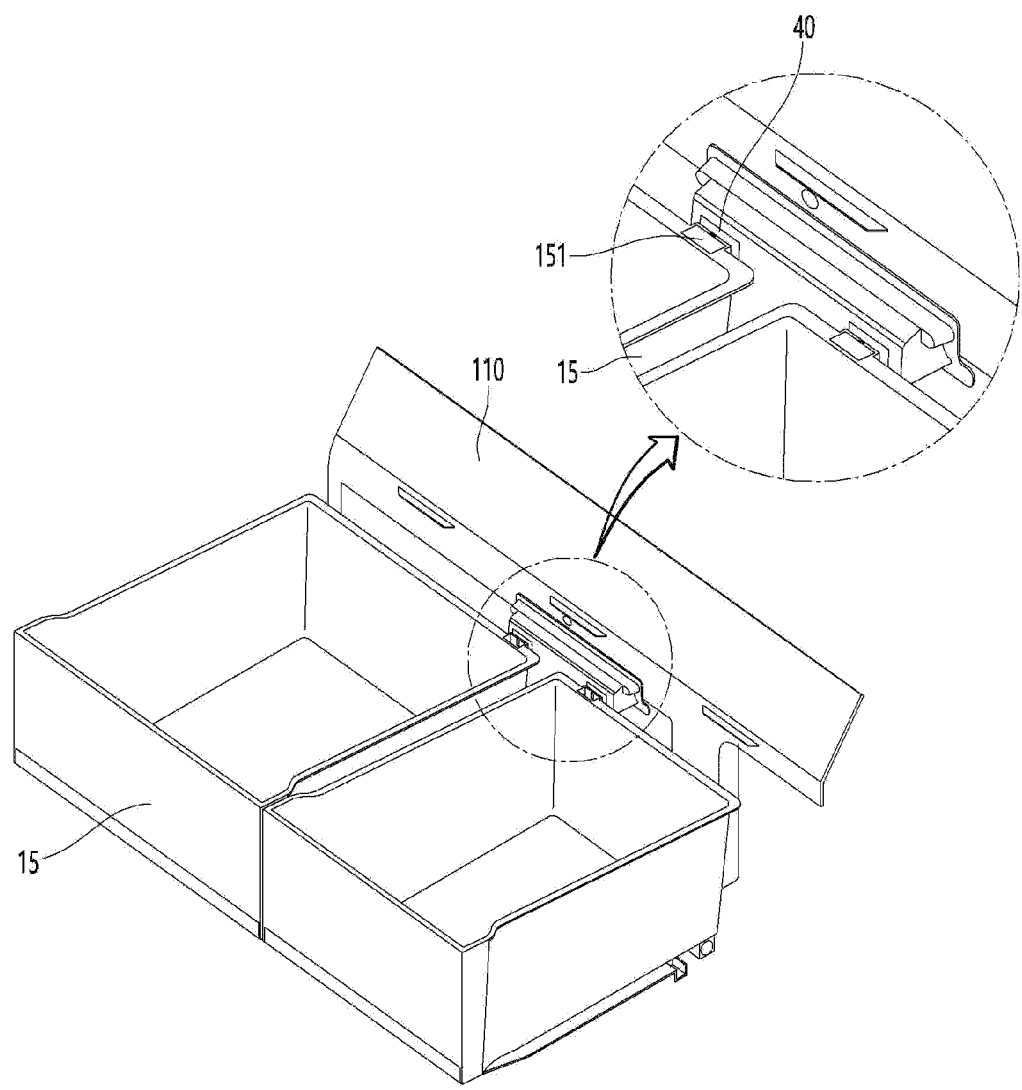
FIG. 4 is a view showing a drawer and a drawer detector according to the present embodiment.

FIG. 1 is a perspective view of a refrigerator according to the present embodiment, and FIG. 2 is a view showing a state in which a refrigerating space door of the present embodiment is opened. FIG. 3 is a view showing a state in which a drawer is withdrawn according to the present embodiment, and FIG. 4 is a view showing a drawer and a drawer detector according to the present embodiment.

Referring to FIGS. 1 to 4, the refrigerator 1 of the present embodiment may include a cabinet 10 having a storage space and refrigerator doors 20 and 23 opening and closing the storage space.

The storage space may include, for example, a refrigerating space 12. The refrigerating space 12 may be opened and closed by the refrigerating space door 20.

When the storage space additionally includes a freezer space, the freezer space may be opened and closed by the freezer space door 23. FIG. 1 shows the refrigerator 1 including the refrigerating space 12 and a freezer space as an example.

The refrigerating space 12 may be located above or below the freezer space, or may be located on the left or right side of the freezer space.

The refrigerating space door 20 may include a first refrigerating space door 21 and a second refrigerating space door 22 disposed from side to side. Each of the first and second refrigerating space doors 21 and 22 may be rotatably connected to the cabinet 10 by a hinge.

The freezer space door 23 may include a single door or a plurality of independently operated doors. When the freezer space door 23 includes a plurality of doors, at least one of the plurality of doors may be slidably connected to the cabinet 10 or rotatably connected to the cabinet 10 by a hinge.

At least one of the first or second refrigerating space doors 21 or 22 may include a main door 30 and a sub door. The main door may open and close the refrigerating space 12, and the sub door may rotate with respect to the main door 30. The sub door may be rotatably connected to the main door or the cabinet 10.

The inside of the refrigerating space 12 may be divided into a plurality of spaces by one or more shelves 17. The refrigerating space 12 may include one or more divided separate storages 13 and 14.

The storages 13 and 14 may include, for example, a first storage 13 for storing vegetables. The first storage 13 may be an internal space of a substantially slidable drawer 15. For example, two drawers 15 may be independently slidably arranged from side to side.

The storages 13 and 14 may include a second storage 14 capable of storing a variety of food. The second storage 14 may be a multi-accommodation space.

The second storage 14 is a space inside a separate basket 16 and may be opened and closed by a separate slidable accommodation space cover. For example, the accommodation space cover may be formed of a transparent material.

In order to check the inside of the storages 13 and 14, a user shall open the refrigerating space door 20 and then open the drawer 15 or open the accommodation space cover again, which may cause cumbersomeness to users.

Accordingly, the refrigerator 1 of the present embodiment may further include a camera 18 for photographing the refrigerating space 12. The camera 18 may photograph at least the storages 13 and 14. A resultant image obtained from an image photographed by the camera 18 may be displayed through a display 30 provided on the refrigerating space door 20 in a state in which the refrigerating space door 20 is closed.

The storages 13 and 14 may be located at a lower side within the refrigerating space 12. The second storage 14 may be located below the first storage 13 and at least a part thereof may be located in front of the first storage 13.

In this case, the camera 18 may be located close to a front end of an upper wall of the refrigerating space 12.

In a state in which the drawer 15 is open, the camera 18 may face the storages 13 and 14, so that the storages 13 and 14 may be photographed by the camera 18.

A discharge unit for discharging cold air toward the refrigerating space door 20 may be provided in an upper wall of the refrigerating space 12, and the camera 18 may be located behind the discharge unit. The refrigerator 1 may further include a storage space lighting unit (see 73 in FIG. 5). The storage space lighting unit may be located behind the camera 18. That is, the camera 18 may be disposed between the discharge unit and the storage space lighting unit. The operation of the camera 18 will be described later.

Meanwhile, a magnet 151 may be provided in the drawer 15, and a drawer detector 40 for detecting the magnet 151 may be provided on a wall or a cold air duct 110 forming the refrigerating space 12. The drawer detector 40 may include a hall sensor for detecting the magnetism of the magnet 151 or a reed switch that is turned on or off depending on a distance from the magnet 151.

When opening of the drawer 15 is detected by the drawer detector 40 in a state in which the refrigerating space door 20 is opened, the camera 18 may be activated. On the other hand, when closing of the drawer 15 is detected by the drawer detector 40, the camera 18 may be deactivated.

When the camera 18 is activated, the camera 18 photographs the refrigerating space 12 at regular time intervals, and when the camera 18 is deactivated, the camera 18 stops photographing.

Figure 5:
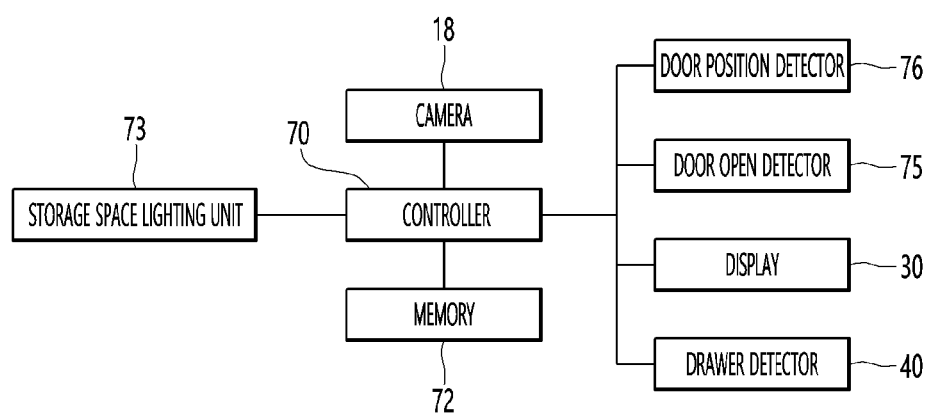
FIG. 5 is a block diagram of a refrigerator according to the present embodiment.
Figure 6:
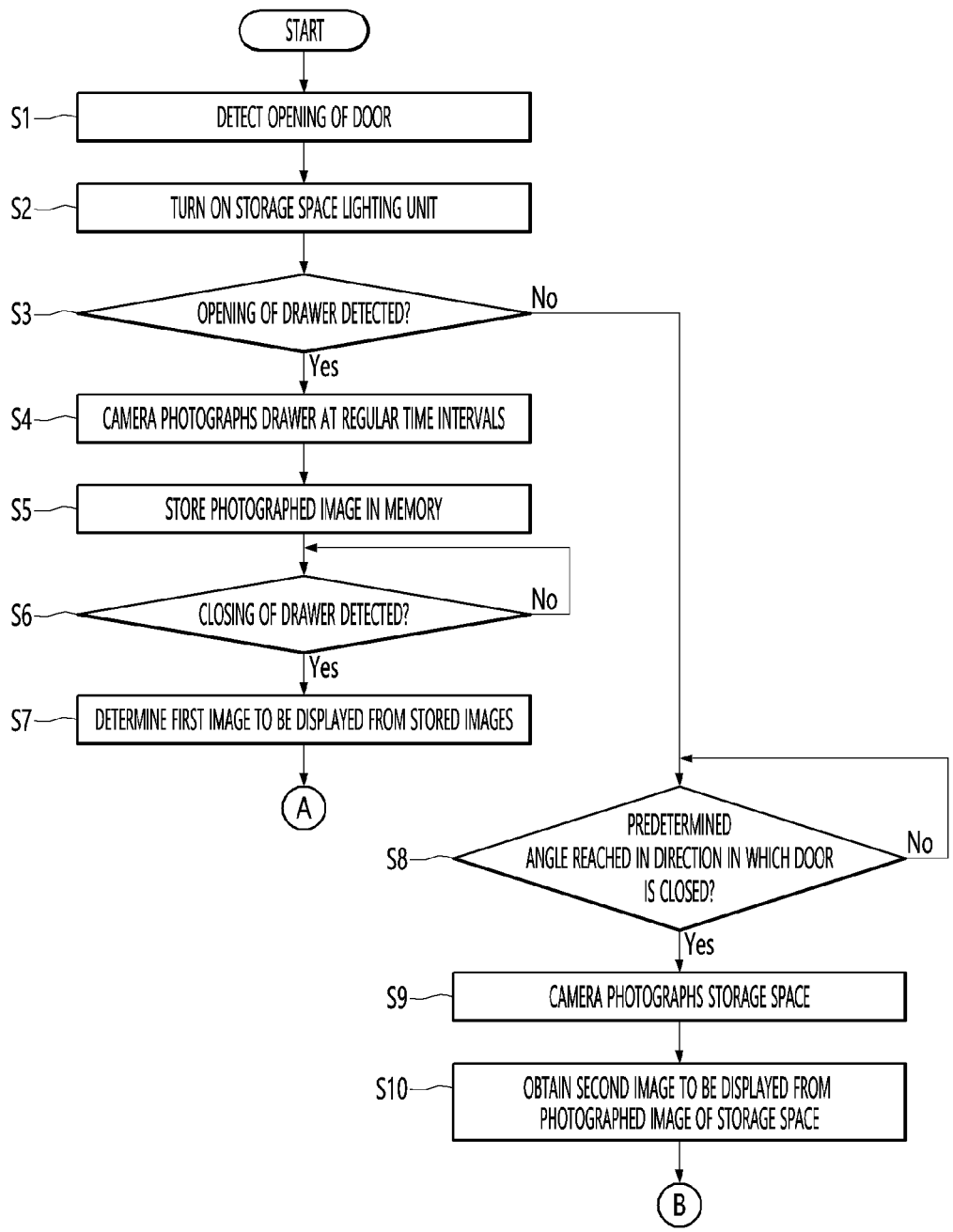
FIGS. 6 and 7 are flowcharts explaining a control method of a refrigerator according to the present embodiment.
Figure 7:
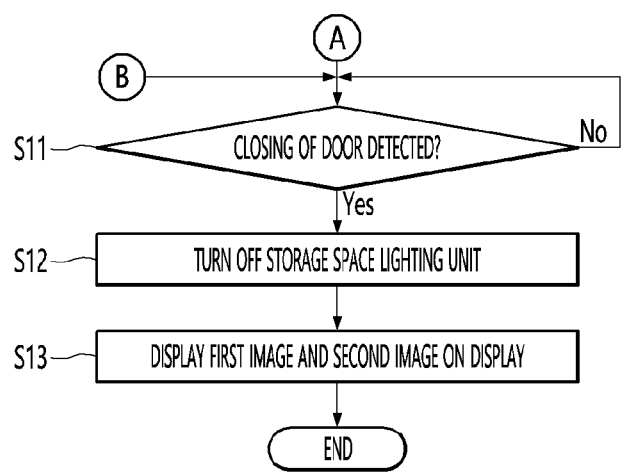
Figure 8:
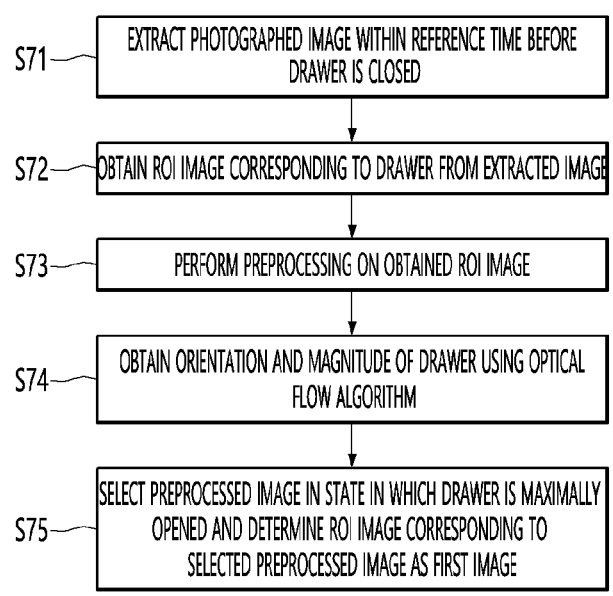
FIG. 8 is a flowchart illustrating a method of processing an image photographed by a camera.

FIG. 5 is a block diagram of a refrigerator according to the present embodiment, and FIGS. 6 and 7 are flowcharts explaining a control method of a refrigerator according to the present embodiment. FIG. 8 is a flowchart illustrating a method of processing an image photographed by a camera.

Figure 9:
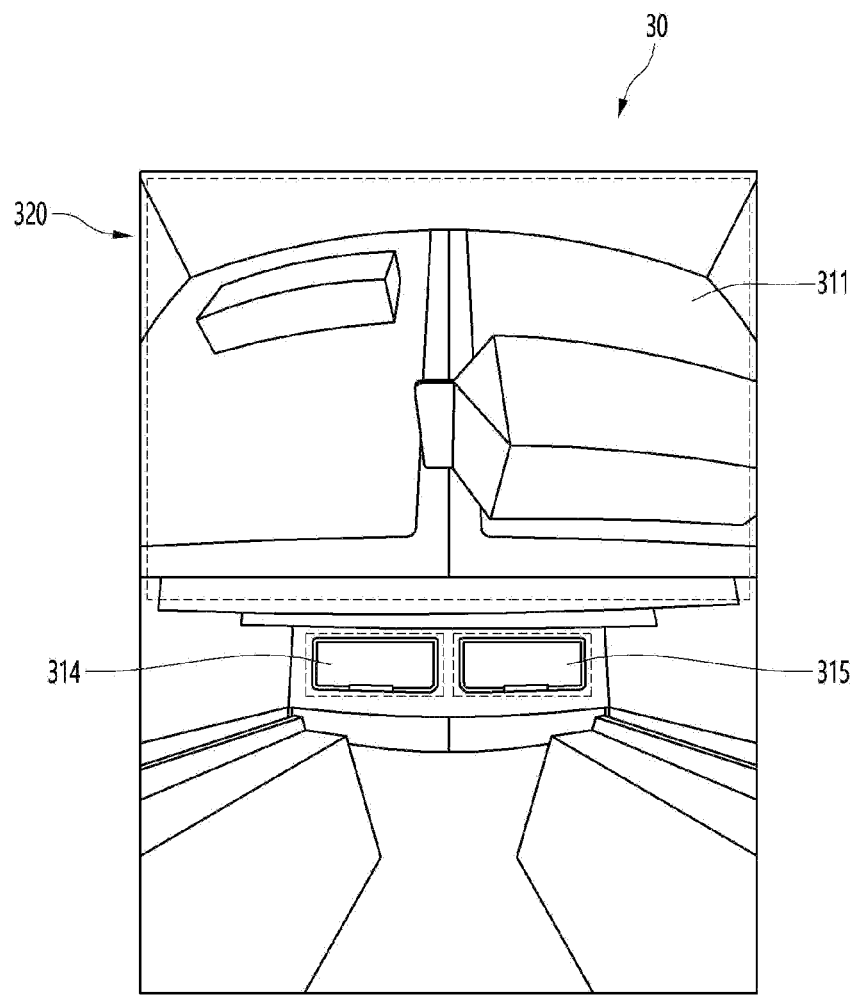
FIG. 9 is a view showing an image photographed by a camera in a state in which the drawer is closed.
Figure 10:
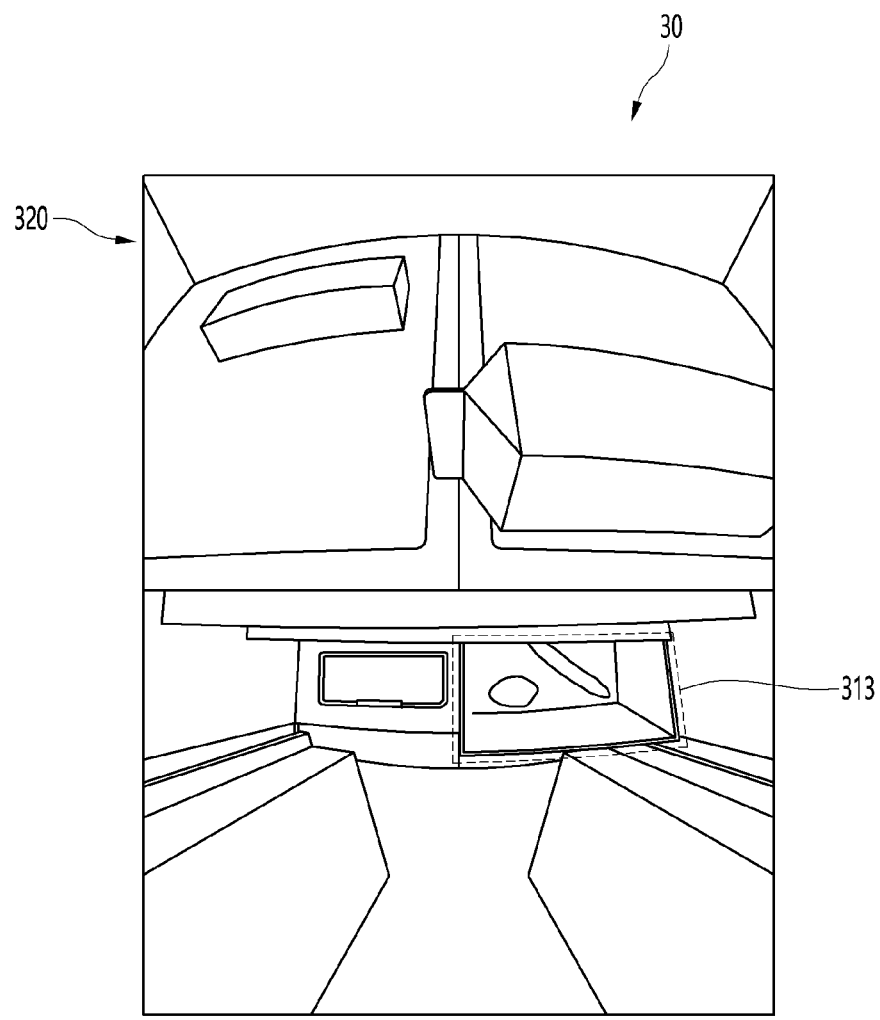
FIG. 10 is a view showing an image photographed by the camera in a state in which the drawer is open.
Figure 11:
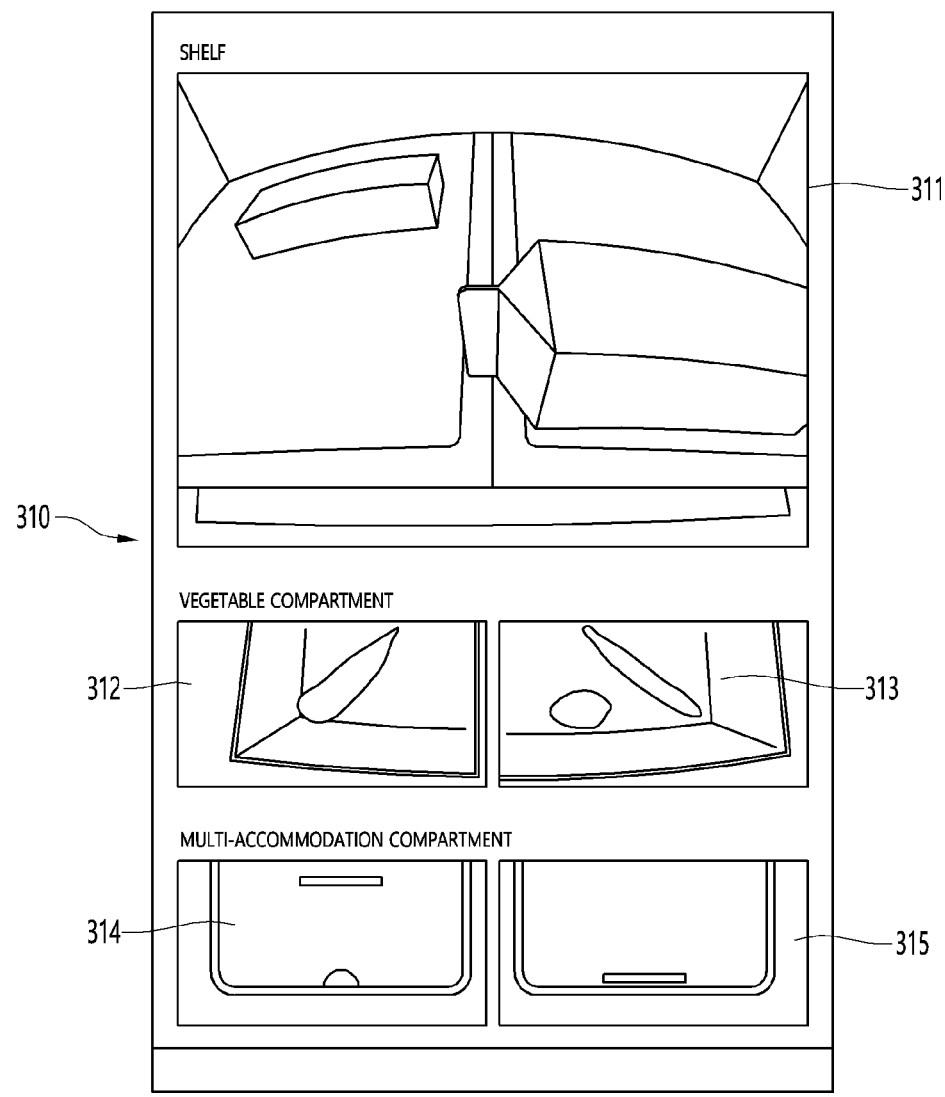
FIG. 11 is a view showing a screen displayed on a display in a state in which the refrigerating space door is opened and then closed.

FIG. 9 is a view showing an image photographed by a camera in a state in which the drawer is closed, and FIG. 10 is a view showing an image photographed by the camera in a state in which the drawer is open. FIG. 11 is a view showing a screen displayed on a display in a state in which the refrigerating space door is opened and then closed.

Referring to FIGS. 5 to 9, the refrigerator 1 according to the present embodiment may include a controller 70. The controller 70 may control the overall operation of the refrigerator 1, control the operation of some of the components constituting the refrigerator 1, or control some functions included in the refrigerator 1.

The controller 70 may include a processor capable of processing images photographed by the camera 18.

The refrigerator 1 may further include a memory 72. An image photographed by the camera 18 may be stored in the memory 72. In addition, the memory 72 may store a resultant image to be described later.

The memory 72 may include a plurality of sectors having different storage purposes. For example, a picture taken by the camera 18 in a state in which the drawer 15 is open may be stored in the first sector. An image photographed while the refrigerating space door 20 is closed in a state in which the drawer 15 is kept closed may be stored in the second sector. A past resultant image displayed on the display 30 to be described later may be stored in the third sector.

The refrigerator 1 may further include a display 30. The display 30 may be provided on the first refrigerating space door 21 or the second refrigerating space door 22. Alternatively, when one refrigerating space door includes a main door and a sub door, it may be provided on the sub door.

The display 30 may further include a touch panel for touch input and an LCD panel for outputting a screen. The display 30 may display a resultant image obtained from an image photographed by the camera 18.

When the controller 70 receives a first operation command, it may operate the display 30. For example, the display 30 may be operated in a state in which the refrigerating space door 20 is closed.

The refrigerator 1 may further include a storage space lighting unit 73. The storage space lighting unit 73 may be turned on when the refrigerator doors 20 and 23 are opened.

The refrigerator 1 may further include a door open detector 75 for detecting opening of the refrigerating space door 20.

The camera 18 may operate when the refrigerating space door 20 is opened and the storage space lighting unit 72 is turned on.

The refrigerator 1 may further include a door position detector 76 for detecting an open position of the refrigerating space door 20. The door position detector 76 may include, for example, an acceleration sensor. The controller may check a rotation direction of the refrigerating space door 20 and positional information (opening angle) of the refrigerating space door 20 based on information output from the acceleration sensor.

Alternatively, the door position detector 76 may include an optical sensor. The optical sensor may be positioned around a hinge of the refrigerating space door 20, for example. The optical sensor may include a light emitting unit and a light receiving unit. Intensity of light received by the light receiving unit may vary during the process of opening the refrigerating space door.

A signal output from the light receiving unit may vary according to the intensity of light received by the light receiving unit.

The controller 70 may check the rotation direction and rotation angle of the refrigerating space door 20 based on the variable pattern of the signal output from the light receiving unit.

The controller 70 may control the camera 18 to photograph the refrigerating space 12 when the refrigerating space door 20 reaches a photographing reference angle in the case where the refrigerating space door 20 is closed after the refrigerating space door 20 is opened at an opening reference angle or more.

The resultant image (current resultant image) obtained from the image photographed by the camera 18 may be displayed on the display 30. Although not limited, the opening reference angle may be greater than or equal to 90 degrees. Also, the photographing reference angle may be 45 degrees.

Accordingly, when the refrigerating space door 20 is closed after the refrigerating space door 20 is opened at less than the opening reference angle, the camera 18 may not operate. In this case, since the camera 18 did not photograph the refrigerating space 12, a past resultant image may be displayed on the display 440 instead of a current resultant image.

The refrigerator 1 may further include the drawer detector 40. When the drawer detector 71 detects opening of the drawer 15 in a state in which one or more of the first refrigerating space door 11 and the second refrigerating space door 22 is opened, the camera 18 may photograph the storages 13 and 14.

Hereinafter, a method of controlling a refrigerator of the present embodiment will be described.

In a state in which the refrigerator 1 is operating, opening of the refrigerating space door 20 may be detected (S1). When opening of the refrigerating space door 20 is detected, the storage space lighting unit 73 may be turned on.

For example, when at least one of the first refrigerating space door 21 or the second refrigerating space door 22 is opened, the storage space lighting unit 73 may be turned on.

After the refrigerating space door 20 is opened, it may be determined whether opening of the drawer 15 is detected (S3). Whether or not the drawer 15 is opened may be continuously determined until the refrigerating space door 20 is closed.

The refrigerating space door 20 may be opened at the opening reference angle or more.

After the refrigerating space door 20 is opened at the opening reference angle in a state in which opening of the drawer 15 is not detected (the drawer is closed), it may be determined whether the refrigerating space door 20 has reached a predetermined angle in a direction in which the refrigerating space door 20 is closed (S8). The predetermined angle is the aforementioned photographing reference angle.

Upon determining that the refrigerating space door 20 has reached the photographing reference angle, the camera 18 photographs the storage space (S9). The images photographed by the camera 18 are stored in the memory 72.

The controller 70 may obtain a resultant image (second image) to be displayed on the display 30 from the image photographed by the camera 18 (S10).

When the door open detector 75 detects closing of the refrigerating space door 20 (S11), the storage space lighting unit 73 is turned off (S12).

When the refrigerating space door 20 is closed, the resultant image may be displayed on the display 30 (S13).

When the refrigerating space door 20 is closed after the refrigerating space door 20 is opened at less than the opening reference angle, the camera 18 does not photograph the refrigerating space 12.

Since the refrigerating space door 20 includes the first refrigerating space door 21 and the second refrigerating space door 22, the door open detector 75 may detect the positions of the first refrigerating space door 21 and the second refrigerating space door 22.

When the second refrigerating space door 22 is closed after the second refrigerating space door 22 is opened at the opening reference angle or more in a state in which the first refrigerating space door 21 is closed, the camera 18 photographs the refrigerating space 12.

When the first refrigerating space door 21 is opened at the opening reference angle or more in a state in which the second refrigerating space door 22 is closed and then and the first refrigerating space door 21 is closed, the camera 18 photographs the refrigerating space 12.

When the first refrigerating space door 21 and the second refrigerating space door 22 are opened simultaneously or sequentially, if each of the refrigerating space doors 21 and 22 is opened at less than the opening reference angle and then closed, the camera 18 doesn't operate.

When the first refrigerating space door 21 and the second refrigerating space door 22 are opened simultaneously or sequentially, if any one of the first refrigerating space door 21 and the second refrigerating space door 22 is opened at the opening reference angle or more, the camera 18 photographs the refrigerating space 12 when one of the doors reaches the photographing reference angle.

When the first refrigerating space door 21 and the second refrigerating space door 22 are opened simultaneously or sequentially, if each of the first refrigerating space door 21 and the second refrigerating space door 22 is opened at the opening reference angle or more, the camera 18 photographs the refrigerating space 12 when the first refrigerating space door 21 reaches the photographing reference angle. In addition, the camera 18 photographs the refrigerating space 12 when the second refrigerating space door 22 reaches the photographing reference angle. In this case, two images are acquired, and the controller 70 may acquire a resultant image from an image obtained later among the two images.

Alternatively, when the first refrigerating space door 21 and the second refrigerating space door 22 are opened simultaneously or sequentially, if each of the first refrigerating space door 21 and the second refrigerating space door 22 is opened at the opening reference angle or more, the camera 18 photographs the refrigerating space 12 when a door closed later among the refrigerating space doors 21 and 22 reaches the photographing reference angle.

Referring to FIG. 9, an image 320 photographed by the camera 18 in a state in which the drawer 15 is closed may include at least a part of the shelf 17 and at least a part of the second storage 14.

When a plurality of shelves 17 are provided in the refrigerating space 12, the uppermost shelf 17 and food placed on the uppermost shelf 17 may be photographed.

The controller 70 may extract a first image part 311 including the shelf 17 and second image parts 314 and 315 including the second storage 14 from the photographed image. At this time, when the second storage 14 is divided from side to side, the left accommodation space image part 314 and the right accommodation space image part 315 may be separately extracted.

Referring to FIG. 11, a resultant image 310 including one or more of extracted image parts may be displayed on the display 30.

When one or more of the first refrigerating space door 21 and the second refrigerating space door 22 are closed after being opened at less than the opening reference angle, the camera 18 does not photograph the refrigerating space 12. Therefore, when the refrigerating space door 20 is closed, the display 30 may display a pas resultant image.

That is, since the resultant image including the image parts extracted in the past is stored in the memory 72, the controller 70 may display the past resultant image on the display 30.

The resultant image 310 displayed on the display 30 may further include third image parts 312 and 313 including the drawer 15.

In the resultant image 310, the first image part 311, the second image parts 314 and 315, and the third image parts 312 and 313 may be arranged in an upper-and-lower direction.

At this time, the first image part 311, the third image parts 312 and 313 and the second image parts 314 and 315 may be sequentially arranged from the upper side in the same pattern as the arrangement of the shelf 17, the first storage part 13 and the second storage 14.

When the refrigerating space door 20 is opened and closed in a state in which the drawer 15 is closed, there is no image of the first storage part 13 in the process of opening and closing the refrigerating space door 20. The resultant image 310 may include the past third image parts 312 and 313.

When the second refrigerating space door 22 is closed after the second refrigerating space door 22 is opened at the opening reference angle or more in a state in which the first refrigerating space door 21 is closed, the controller 70 extracts the first image part 311 and the right accommodation space image part 315 from the photographed image.

In the present specification, an image part extracted from the image photographed in the process of opening and closing the refrigerating space door 20 may be referred to as an updated image part or a current image part.

In this case, the resultant image 310 displayed on the display 30 may include the updated first image part 311, the past third image parts 312 and 313, the past left accommodation space image part 314, and the updated right accommodation space image part 315.

The reason why the resultant image 310 includes the updated right accommodation space image part 315 is because the storage state of the right accommodation space may change in a state in which the second refrigerating space door 22 is opened and then closed.

When the first refrigerating space door 21 is opened at the opening reference angle or more and then the first refrigerating space door 21 is closed in a state in which the second refrigerating space door 22 is closed, the controller 70 extracts the first image part 311 and the left accommodation space image part 314 from the photographed image.

In this case, the resultant image 310 displayed on the display 30 may include the updated first image part 311, the past third image parts 312 and 313, the updated left accommodation space image part 314, and the past right accommodation space image part 315.

The reason why the resultant image 310 includes the updated left accommodation space image part 314 is because the storage state of the left accommodation space may be changed in a state where the first refrigerating space door 21 is opened and then closed.

The first refrigerating space door 21 and the second refrigerating space door 21 are opened simultaneously or sequentially, the first refrigerating space door 21 is opened at the opening reference angle or more, and after the second refrigerating space door 22 is opened at less than the opening reference angle, the first and second refrigerating space doors 21 and 22 may be closed.

In this case, the resultant image 310 displayed on the display 30 may include the updated first image part 311, the past third image parts 312 and 313, the updated left accommodation space image part 314, and the past right accommodation space image part 315.

The first refrigerating space door 21 and the second refrigerating space door 21 are opened simultaneously or sequentially, the first refrigerating space door 21 is opened at less than the opening reference angle, and after the second refrigerating space door 22 is opened at the opening reference angle or more, the first and second refrigerating space doors 21 and 22 may be closed.

In this case, the resultant image 310 displayed on the display 30 may include the updated first image part 311, the past third image parts 312 and 313, the past left accommodation space image part 314, and the updated right accommodation space image part 315.

When the first refrigerating space door 21 and the second refrigerating space door 22 are opened simultaneously or sequentially, each of the first refrigerating space door 21 and the second refrigerating space door 22 may be opened at the opening reference angle or more and then closed.

In this case, the resultant image 310 displayed on the display 30 may include the updated first image part 311, the past third image parts 312 and 313, and the updated second image parts 314 and 315. That is, the resultant image 310 may include the updated left accommodation space image part 314 and the updated right accommodation space image part 315.

Meanwhile, as a result of the determination in step S3, after one or more of the first refrigerating space door 21 and the second refrigerating space door 22 are opened, when opening of the drawer 15 is detected, the camera 18 is activated. Then, the camera 18 photographs the drawer 15 at regular time intervals (S4).

As shown in FIG. 10, the image photographed by the camera 18 may include at least a part of the shelf 17 and the open drawer 15.

When the drawer 15 is divided into a left drawer and a right drawer, the left drawer and the right drawer may move independently. FIG. 10 shows an image photographed in a state in which the right drawer is withdrawn, for example.

The images photographed by the camera 18 in a state in which the drawer 15 is open are stored in the memory 72 (S5). At this time, the images are stored in chronological order in the memory 72. The images photographed during a reference time may be stored in the first sector of the memory 72.

After opening of the drawer 15 is detected, it may be determined whether or not closing of the drawer 15 is detected (S6).

When the drawer detector 40 detects closing of the drawer 15, the photographing of the camera 18 may end. Since the camera 18 takes pictures at regular time intervals until the drawer 15 is opened and closed, a plurality of images may be stored in the memory 72 in chronological order.

The controller 70 selects an image with a maximum withdrawal distance of the drawer 15 and least movement from among a plurality of images stored in the memory 72. Then, a resultant image (first image) to be displayed on the display 30 is determined from the selected image.

Referring to FIGS. 8 and 10, the controller 70 extracts a plurality of images photographed within a reference time in reverse order based on a time point when the drawer 15 is closed (S71).

Next, the controller 70 obtains a region of interest (ROI) image corresponding to the drawer 15 from each of the plurality of extracted images (S72).

When the drawer 15 includes a left drawer and a right drawer, the image photographed by the camera 18 may include the left drawer and the right drawer.

The controller 70 may obtain an ROI image corresponding to the open drawer. For example, when only the left drawer is opened and then closed, an ROI image corresponding to the left drawer may be obtained from photographed images. Conversely, when only the right drawer is opened and then closed, an ROI image corresponding to the right drawer may be obtained from photographed images.

When the left drawer and the right drawer are simultaneously or sequentially opened and then closed, ROI images corresponding to the left drawer and the right drawer may be obtained from photographed images.

The controller 70 may perform a preprocessing process on the obtained ROI image (S73). For example, it is possible to obtain an optimal image required for analysis by modifying gamma, alpha, beta values, etc.

The controller 70 obtains an orientation and magnitude of the drawer 15 from the preprocessed image by using an optical flow algorithm for the preprocessed image (S74).

For example, the orientation and magnitude of the drawer 15 may be obtained by extracting a plurality of feature points from each preprocessed image and determining the orientations and magnitudes of the feature points.

After performing the optical flow algorithm, one image having the maximum withdrawal distance of the drawer 15 and the minimum magnitude of the drawer 15 or the object in the drawer 15 may be selected (or obtained) from among a plurality of preprocessed images, and the ROI image corresponding to the selected preprocessed image may be finally determined as the first image (S75). The first image may correspond to a third image part in a resultant image to be described later.

In this embodiment, the withdrawal distance of the drawer being the maximum does not mean the maximum withdrawal distance of the drawer 15. For example, in the case where the maximum pulling distance of the drawer is 20 cm, the image photographed when the drawer is withdrawn by 10 cm is highly likely to be determined as the second image when the drawer is withdrawn by 10 cm and then closed.

If there is no image with a small magnitude as a result of performing the optical flow algorithm, the controller 70 may not select an image. That is, when a condition for selecting one ROI image from among a plurality of ROI images is not satisfied, the image may not be selected.

For example, when the user moves or withdraws an object in the drawer 15 while opening the drawer 15 and the user moves the object in the drawer 15 even in the process of closing the drawer 15, since the magnitude of the arm is relatively large while the user's hand and arm are photographed, in this case, one ROI image may not be selected from among a plurality of ROI images.

In this case, after the refrigerating space door 20 is closed, the display 30 may display a past third image part of the drawer. At this time, the resultant image will include a past first image part and a past second image part.

In the present embodiment, the preprocessing process may be omitted. In this case, the controller 70 may determine the orientation and magnitude of the drawer by extracting a plurality of feature points from the plurality of extracted ROI images and determining the orientations and magnitudes of the feature points. The controller 70 may select one ROI image from among the plurality of ROI images based on the determined orientation and magnitude of the drawer. The controller 70 may determine the selected ROI image as an image to be displayed.

Meanwhile, when closing of the refrigerating space door 20 is detected by the door open detector 75 after the drawer 15 is closed (S11), the storage space lighting unit 73 is turned off (S12).

When the refrigerating space door 20 is closed, the resultant image may be displayed on the display 30 (S13).

Referring to FIG. 11, a resultant image 310 including one or more of extracted image parts may be displayed on the display 30.

When the refrigerator door 20 is opened and the drawer 15 is opened and closed, since the ROI image corresponding to the drawer 15 in the image photographed by the camera 18 is used, the resultant image 310 may include the past first image part 311, the updated third image parts 312 and 313, and the past second image parts 314 and 315.

The controller 70 may compare the past third image parts 312 and 313 with the updated third image parts 312 and 313. If there is an item added to the drawer 15, the type of item is recognized and an information tag for item recognized in the updated third image parts 312 and 313 may be displayed.

When the left drawer is opened and closed in a state in which the second refrigerating space door 22 is closed and the first refrigerating space door 21 is opened, the resultant image 310 may include the past first image part 311 and the updated left drawer image part 312, the past right drawer image part 313 and the past second image parts 314 and 315.

When the right drawer is opened and closed while the first refrigerating space door 21 is closed and the second refrigerating space door 22 is opened, the resultant image 310 may include the past first image part 311, the past left drawer image part 312, the updated right drawer image part 313, and the past third image parts 314 and 315.

When the first and second refrigerating space doors 21 and 22 are opened and the left and right drawers are opened and closed, the resultant image 310 may include the past first image unit 311, the updated left drawer image part 312, the updated right drawer image part 313, and the past third image parts 314 and 315.

According to the present embodiment, there is an advantage in that food stored in the storage space can be checked in a state of closing the refrigerator door.

According to the present embodiment, since the position of the sliding drawer may be determined by analyzing the photographed images, an optimal image can be displayed on the display by determining the position of the drawer without a marker. In addition, since no marker is present in the drawer, it is possible to prevent deterioration in aesthetics when the drawer is withdrawn.

According to the present embodiment, since images are sequentially stored during a reference time set in the memory and images to be displayed are determined in the reverse order of a storage completion time, it is possible to show an optimal image to a user without increasing the size of the memory.

The invention claimed is:

1. A refrigerator comprising:
a cabinet defining a storage space;
a drawer provided in the storage space and configured to be slidably opened and closed;
a sensor provided in the cabinet and configured to detect opening and closing of the drawer;
a door configured to open and close the storage space;
a camera provided in the cabinet configured to capture a plurality of images of the storage space including the drawer during opening and closing of the drawer;
a controller configured to select an image from among the plurality of images captured by the camera; and
a display to present a resultant image including at least a part of the selected image,
wherein the controller is configured to:
extract a plurality of region of interest (ROI) images corresponding to the drawer from, respectively, the plurality of images,
determine an orientation and a magnitude of the drawer based on a plurality of extracted ROI images,
select one ROI image from the plurality of ROI images based on the orientation and the magnitude of the drawer; and
obtain the resultant image based on the selected ROI image.

2. The refrigerator of claim 1, wherein the controller is configured to determine the orientation and the magnitude of the drawer based on extracting a plurality of feature points from the plurality of extracted ROI images and determining orientations and magnitudes of the feature points.

3. The refrigerator of claim 2, wherein the controller is configured to:
determine the and the magnitude of the drawer based on preprocessing each of the plurality of extracted ROI images and extracting the plurality of feature points from the preprocessed images, select one preprocessed image from the plurality of preprocessed images based on the orientation and the magnitude of the drawer, and select the ROI image corresponding to the selected preprocessed image.

4. The refrigerator of claim 1, wherein the controller is configured to select one of the plurality of extracted ROI images associated with a maximum withdrawal distance and a minimum orientation of the drawer.

5. The refrigerator of claim 1,
wherein the door includes a first door and a second door arranged in a left-and-right direction,
wherein the drawer includes a left drawer and a right drawer,
wherein an image photographed by the camera includes an open one of the left drawer or the right drawer, and
wherein the resultant image includes divided left drawer and right drawer image regions.

6. The refrigerator of claim 5,
wherein, when the left drawer is opened and then closed while the second door is closed and the first door is opened, the controller is configured to extract a plurality of ROI images corresponding to the left drawer from the plurality of photographed images, to analyze the plurality of extracted ROI images, and to determine one of the extracted ROI images to be displayed, and
wherein the left drawer region of the resultant image corresponds to the determined one of the extracted ROI images, and the right drawer region corresponds to stored, previously captured image of the right drawer.

7. The refrigerator of claim 5,
wherein, when the right drawer is opened and then closed while the first door is closed and the second door is opened, the controller is configured to extract a plurality of ROI images corresponding to the right drawer from the plurality of photographed images, to analyze the plurality of extracted ROI images, and to determine one of the extracted ROI images to be displayed, and
wherein the left drawer region of the resultant image corresponds to a stored, previously captured image of the left drawer, and the right drawer region corresponds to the determined one of the extracted ROI images.

8. The refrigerator of claim 5,
wherein, when the left drawer and the right drawer are opened and then closed while the first door and the second door are opened, the controller is configured to extract a plurality of first ROI images corresponding to the left drawer and a plurality of second ROI images corresponding to the right drawer from the plurality of photographed images, to analyze the plurality of extracted first and second ROI images and to determine one of the first ROI images and one of the second ROI images to be displayed, and
wherein the left drawer region of the resultant image corresponds to the selected one of the first ROI images and the right drawer region corresponds to the selected one of the second ROI images.

9. The refrigerator of claim 5,
wherein, when the left drawer is opened and then closed while the second door is closed and the first door is opened, the controller is configured to extract a plurality of ROI images corresponding to the left drawer from the plurality of photographed images, to analyze the plurality of extracted ROI images, and to determine one of the extracted ROI images be displayed, and
wherein, when a condition for extracting one ROI image from the plurality of extracted ROI images is not satisfied, the left drawer region and the right drawer region of the resultant image correspond to stored, previously captured images of the left drawer and the right drawer.

10. The refrigerator of claim 5,
wherein, when the right drawer is opened and then closed while the first door is closed and the second door is opened, the controller is configured to extract a plurality of ROI images corresponding to the right drawer from the plurality of photographed images, to analyze the plurality of extracted ROI images and to determine one of the extracted ROI images to be displayed, and
wherein, when a condition for extracting one ROI image from the plurality of extracted ROI images is not satisfied, the left drawer region and the right drawer region of the resultant image correspond to stored, previously captured images of the left drawer and the right drawer.

11. The refrigerator of claim 5,
wherein, when the left drawer and the right drawer are opened and then closed while the first door and the second door are opened, the controller is configured to extract a plurality of first ROI images corresponding to the left drawer and a plurality of second ROI images corresponding to the right drawer from the plurality of photographed images, to analyze the plurality of extracted first and second ROI images, and to determine one of the first ROI images and one of the second ROI images to be displayed, and
wherein, when a condition for extracting one ROI image from the plurality of first and second ROI images is not satisfied, the left drawer region and the right drawer region of the resultant image correspond to stored, previously captured images of the left drawer and the right drawer.

12. The refrigerator of claim 1, further comprising a shelf located above the drawer and an accommodation space located below the drawer,
wherein the camera photographs the storage space when the door is being and closed while closing the drawer,
wherein an image photographed by the camera includes the shelf and the accommodation space, and
wherein, after closing the door, the resultant image including a first image region including the shelf, a third image region including the drawer and a second image region including the accommodation space.

13. The refrigerator of claim 12,
wherein the door includes a first door and a second door arranged in a left-and-right direction,
wherein the image photographed by the camera includes a left accommodation space and a right accommodation space, and
wherein the resultant image includes divided left and right accommodation space image regions.

14. The refrigerator of claim 13, wherein, when the second door is opened and then closed while the first door is closed and the drawer is closed, the display displays an updated first image region corresponding to the captured image, a past third image region and a past left accommodation space image region corresponding to at least one previously captured image stored in a memory, and an updated right accommodation space image region corresponding to the captured image.

15. The refrigerator of claim 13, wherein, when the first door is opened and then closed while the second door is closed and the drawer is closed, the display displays an updated first image region corresponding to the captured image, an updated left accommodation space image region corresponding to the captured image, and a past third image region and a past right accommodation space image region corresponding to at least one previously captured image stored in the memory.

16. The refrigerator of claim 13, wherein, when the first and second doors are sequentially or simultaneously opened and then closed while closing the drawer, the display displays a resultant image including an updated first image region corresponding to the captured image, a past third image region corresponding to at least one previously captured image stored in a memory, an updated left accommodation space image region corresponding to the captured image, and an updated right accommodation space image region corresponding to the captured image.

17. The refrigerator of claim 13, wherein the camera photographs the storage space when one or more of the first door or the second door is opened to at least an opening reference angle and then closed.

18. The refrigerator of claim 1, wherein the camera is provided on an upper inner surface of the cabinet and captures the images in a downward direction.

19. The refrigerator of claim 1,
wherein the selected ROI image corresponds to the drawer being withdrawn.

20. The refrigerator of claim 1, wherein:
the drawer includes a first drawer and a second drawer provided in the storage space,
the selected ROI image is associated with the first drawer being opened and the second drawer being closed.

* * * * *